United States Patent [19]

Andy

[11] Patent Number: 4,525,494
[45] Date of Patent: Jun. 25, 1985

[54] HIGH STRENGTH FLAME RESISTANT POLY-OLEFINS COMPRISING SURFACE COATED ALUMINA HYDRATE PLUS ORGANIC TITANATE AND METHODS OF MAKING THE SAME

[76] Inventor: Robert Andy, c/o Washington Penn Plastic Co., Inc., 2833 W. Chestnut St., Washington, Pa. 15301

[21] Appl. No.: 271,852

[22] Filed: Jun. 9, 1981

[51] Int. Cl.$^3$ ............... C08K 9/04; C08K 5/56; C08F 210/06; C08F 10/06
[52] U.S. Cl. .................. 523/200; 524/528; 524/584; 264/176 R
[58] Field of Search ............ 260/42.14; 523/200; 524/584, 528

[56] References Cited

U.S. PATENT DOCUMENTS

| | | | |
|---|---|---|---|
| 4,192,792 | 3/1980 | Sugarman et al. | 523/200 |
| 4,283,316 | 8/1981 | Bonsignore | 524/430 |
| 4,390,653 | 6/1983 | Levendusky et al. | 524/322 |

FOREIGN PATENT DOCUMENTS

| | | |
|---|---|---|
| 2041960 | 9/1980 | United Kingdom . |
| 2068347 | 8/1981 | United Kingdom . |
| 2070021 | 9/1981 | United Kingdom . |

OTHER PUBLICATIONS

Derwent Abst., 73784 A/41, Dainippon Toryo, (9--6-78), J53102381.
Derwent Abst., 01097 Y/01, Idemitsu Kosan, (11-1-9-76), J51133344.
Derwent Abst., 79561 Y/45, Chem Werk, (8-24-77), DL126977.
Derwent Abst., 29882 C/17, Furukawa, (3-10-80), J55034226.

*Primary Examiner*—Herbert J. Lilling
*Attorney, Agent, or Firm*—William J. Ruano

[57] ABSTRACT

A flame retardant polypropylene product and method are provided having the composition of about 60% to 64% alumina hydrate surface coated with about 1.0 wt. % of isostearic acid, about 0.25% to 1% organic titanate and the balance propropylene resin.

7 Claims, No Drawings

HIGH STRENGTH FLAME RESISTANT POLY-OLEFINS COMPRISING SURFACE COATED ALUMINA HYDRATE PLUS ORGANIC TITANATE AND METHODS OF MAKING THE SAME

This invention relates to high strength flame resistant poly-olefins and methods of making the same and particularly to polypropylene systems which have both unusually high strength and resistance to flaming.

The desirability of reducing the flamability of polypropylene and similar poly-olefins has long been recognized. Most flame retardants which have been used with poly-olefins create masses of highly toxic black smoke and fumes. This is, of course, most undesirable. It has long been known that alumimum hydrate is a desirable flame retardant for use in organic systems where it is compatable. On heating in such systems it produces $CO_2$ and $H_2O$ with no dark smoke or toxic fumes. Unfortunately, however, hydrated alumina, has resisted incorporation into polypropylene and like systems and all attempts to use it in such systems have failed. The resultant mixtures have been of such low strength as to be totally unacceptable for commercial purposes.

The present invention provides a polypropylene composition containing hydrated alumina which has high Izod impact strength, increased flow, increased elongation, increased deflection and increased Gardner impact values compared with the original polypropylene, without loss of tensile strength. The practice of this invention will give flame retardance to any polypropylene system while enhancing the strength of the product. For example, the practice of this invention has produced polypropylene products that have impact strengths which are increased four times and flow rates increased seven times over the starting material without loss of tensile or any other critical property.

The composition of the present invention is basically an alumina trihydrate filled polypropylene compounded with an organic titanate, isopropyl (tridiodylphosphato) titanate. The alumina trihydrate filler is Alcoa Hydrated Alumina (Lubral coated). "Lubral" is a registered trademark (No. 1,251,981) of Aluminum Company of America of Pittsburgh, Pa. applied to a surface modified alumina hydrate composition described in their Bonsignore U.S. Pat. No. 4,283,316, dated Aug. 11, 1981, and in their Levendusky et al. U.S. Pat. No. 4,390,653 (col. 2, lines 39-48). As recited in said Levendusky patent (col. 2, lines 39-40), the composition is: "alumina hydrate surface coated with about 1.0 wt. % of isostearice acid". The formulation of such a polypropylene composition according to this invention would be as follows:

| 60-64% | Alcoa Hydrated Alumina (Lubral Coated) |
| 0.25%-1.0% | Isopropyl (tridiodylphosphate) titanate |
| Balance | Polypropylene polymer |

The polypropylene polymer is preferably a mixture of polypropylene copolymer such as Hercules PP 7823 and polypropylene homopolymer, such as Hercules PP 6523, in equal amounts.

| 35 lb. | (18.4%) | Hercules PP 7823 polypropylene copolymer |
| 35 lb. | (18.4%) | Hercules PP 6523 polypropylene homopolymer |
| 120 lb. | (63.7%) | Alcoa hydrated alumina, lubral coated |
| 227 gms. | (.05%) | Kenrick KR 12 [Isopropyl (trididyl phosphate) titanate] |

The composition is formulated by ribbon blending all of the materials and then mixing in a Banbury mixer, and extruding through a single screw and die plate to pelletize the material. The temperature during processing is critical, with a maximum process temperature of about 380° F. and a minimum of 340° F. or a range of about 40° F. If the temperature is too low, the material cannot be processed. If the temperature is too high water will be expelled from the system and cause foaming.

The product of this invention has been subjected to exhaustive tests by the Underwriters Laboratories and has received approval as an acceptable flame retardant at the highest approval level.

The significance of this invention can perhaps be best understood by reference to the following example.

The preferred composition described above was prepared by ribbon mixing the components, then transferring the mixture to a Stewart-Bolling Banbury mixer, mixed thoroughly, then transferred to a single screw extruder and extruded through a die plate and pelletized. The mixing and extrusion was carried out at temperatures of between 350° F. to 380° F. The product was tested with the following results:

| UL94 VBT | Flexural Modulus ($10^{-5}$ psi) | Flexural Strength ($10^{-3}$ psi) | Unnotched Izod[1] (ft-lb/in) | Notched Izod[2] (ft-lb/in) |
| --- | --- | --- | --- | --- |
| V-0 | 3.25 | 5.00 | No break | 4.14 |

| Melt Index[3] (g/10 min) | Tensile Strength @ Yield (lb/in$^2$) | Tensile Strength @ Break (lb/in$^2$) | Elongation (%) |
| --- | --- | --- | --- |
| 7.2 | 2814 | 2510 | 33 |

[1] ½" sample: 2# hammer.
[2] ¼" sample: 10# hammer.
[3] Condition N: 10000 g load; 190° C.

The foregoing test shows the very high burn test values and physical properties of the material of this invention. The first parameter is the Underwriters Lab. Vertical Burn Test (UL 94 VBT). The material easily passed this test. The notched Izod impact value to be acceptable must be near 1.0 ft-lb/in. This was exceeded by four times. The unnotched Izod test showed no break at the standard test conditions. The high melt index and tensile are apparent from the test data.

The test show a remarkable set of physical characteristics combined with flame retardance, a combination which heretofore could not be obtained with polypropylene.

The foregoing specification sets out certain preferred practices and embodiments of this invention, however, it will be understood that this invention may be otherwise embodied within the scope of the following claims.

I claim:

1. A flame retardant polypropylene composition comprising about 60% to 64% alumina hydrate surface coated with about 1.0 wt. % of isostearic acid, about 0.25% to 1% organic titanate and the balance polypropylene resin.

2. A flame retardant polypropylene composition as claimed in claim 1 wherein the organic titanate is isopropyl (tridiodylphosphato) titanate.

3. A flame retardant composition as claimed in claim 1 or 2 wherein the polypropylene resin is a mixture of polypropylene copolymer and polypropylene homopolymer.

4. A flame retardant composition as claimed in claim 1 having the composition of 63.7% alumina hydrate surface coated with about 1.0 wt. % of isostearic acid, 18.4% polypropylene homopolymer, 18.4% polypropylene copolymer and 0.5% isoprophyl (tridyl-phosphato) titanate.

5. The method of making a flame retardant polypropylene composition comprising the steps of:

(a) mixing polypropylene resin with alumina hydrate surface coated with about 1.0 wt. % of isostearic acid and organic titanate;

(b) extruding said mixture through a die plate to form pellets;

(c) controlling the temperature of the mixture between 350° F. to 380° F. during said process steps; and (d) cooling said extruded pellets to room temperature to produce a final product.

6. The method as claimed in claim 5 wherein the polypropylene resin is a mixture of polypropylene copolymers and polypropylene homopolymers.

7. The method as claimed in claim 5 or 6 wherein the mixture comprises about 60% to 64% alumina hydrate surface coated with about 1.0 wt. % of isostearic acid, about 0.25% to 1% organic titanate and the balance polypropylene resin.

* * * * *